(12) United States Patent
Johnson et al.

(10) Patent No.: US 8,150,794 B2
(45) Date of Patent: Apr. 3, 2012

(54) DATA FUSION FRAMEWORK FOR WIDE-AREA ASSESSMENT OF BURIED UNEXPLODED ORDNANCE

(75) Inventors: Kevin J Johnson, Alexandria, VA (US); Christian P Minor, Potomac, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 515 days.

(21) Appl. No.: 12/490,107

(22) Filed: Jun. 23, 2009

(65) Prior Publication Data

US 2010/0076920 A1 Mar. 25, 2010

Related U.S. Application Data

(60) Provisional application No. 61/075,169, filed on Jun. 24, 2008.

(51) Int. Cl.
*G06N 5/00* (2006.01)
(52) U.S. Cl. ............................................. 706/52; 706/45
(58) Field of Classification Search .................... 706/52, 706/45
See application file for complete search history.

(56) References Cited

OTHER PUBLICATIONS

Jin, et al., Vehicle detection from high-resolution satellite imagery using morphological shared-weight neural networks, Image and Vision Computing 25 (2007), pp. 1422-1431.*
B.J. Johnson, T.G. Moore, B.J. Blejer, C.F. Lee, T.P. Opar, S. Ayasli, and C.A. Primmerman, "A Research and Development Strategy for Unexploded Ordnance Sensing," SERDP project UX-860 final report, Apr. 1996.
Yan Zhang; Collins, L.M.; Carin, L., "Unexploded ordnance detection using Bayesian physics-based data fusion," *Integrated Computer-Aided Engineering* 10(3), 231-47, (2003).
Collins, L.M.; Zhang, Y.; Carin, L., "Model-based statistical sensor fusion for unexploded ordnance detection," *Proceedings of IEEE International Geoscience and Remote Sensing Symposium. IGARSS 2002*, Jun. 24-28, 2002, Toronto, Ont., Canada, vol. 3, p. 1556-9.
I. Shamatava, F. Shubitidze, c.c. Chem, H.S. Youn, K. O'Neil, K. Sun, "Potential benefits of combining EMI and GPR for enhanced UXO discrimination at highly contaminated sites," Proceedings of SPIE vol. 5415, 1201-1210, (2004).
L..M. Collins, Y. Zhang, J. Li, H. Wang, L. Carin, S.J. Hart, S.L. Rose-Pehrsson, H.H. Nelson, and J.R. McDonald, "A Comparison of the performance of Statistical and Fuzzy Algorithms for Unexioded Ordnance Detection," IEEE Transactions on Fuzz Systems, 9(1), 17-30,( 2001).

* cited by examiner

*Primary Examiner* — Wilbert L Starks
(74) *Attorney, Agent, or Firm* — Amy L. Ressing; Kerry L. Broome (57) ABSTRACT

A data fusion framework is provided for wide-area assessments of unexploded ordnance. One or more wide-area survey data sources representing assessments of geographic sites that may contain unexploded ordnance (UXO) can be analyzed by a data source module as part of the data fusion framework. The data sources can include a geographic registration and a degree of belief and the data source module can register the data sources to a common map grid. A feature layer module can extract a plurality of feature layers from the wide-area survey data sources. A feature map module can generate a plurality of feature maps for each of the plurality of feature layers based on the degree of belief. Finally, a data fusion module can combine the plurality of feature maps and generate a plurality of output maps. This output maps can then be used by UXO site managers to support decisions regarding remediation efforts.

20 Claims, 6 Drawing Sheets

DATA FUSION FRAMEWORK FOR WIDE-AREA ASSESSMENT OF BURIED UNEXPLODED ORDNANCE

CROSS-REFERENCE TO RELATED APPLICATIONS

This application claims priority to provisional patent application entitled, "Data Fusion Framework for Wide Area Assessment of Buried Unexploded Ordnance," filed on Jun. 24, 2008, and assigned U.S. application Ser. No. 61/075,169; the entire contents of which are hereby incorporated by reference.

FIELD OF THE INVENTION

The invention relates generally to a data fusion framework. More particularly, the invention relates to a data fusion framework that will form the basis of a cohesive data management and decision making utility for processing information acquired in the course of performing wide-area surveys of potential unexploded ordnance (UXO) remediation sites, and for other sensing and surveillance tasks.

BACKGROUND

Current estimates place the total area of possibly unexploded ordnance (UXO) contaminated sites at approximately 10 million acres. The overall cost of remediation of these sites with current methods and sensing technologies would most likely reach into the tens of billions of dollars. Studies have estimated that up to 80% of typical sites of potential contamination are actually UXO-free. Therefore, there is a need to quickly and reliably scan large sites (on the order of 10,000 acres) in order to rapidly identify regions that are free of UXO and regions that must be subjected to more detailed and time-intensive examination and remediation with established UXO detection tools.

Effective wide-area UXO assessment is centered on the capability to rapidly scan large tracts of land and obtain relevant, useful information in the process. Two possible modes of enhancement to wide-area UXO assessment are, first, decreasing the false alarm rate of current UXO sensing technologies, and second, utilizing alternate sensing technologies and survey methods that scan larger areas or more rapidly cover large areas than current sensing platforms.

In the conventional art, standard, ground-based UXO sensing technologies include methods such as vehicular-mounted time and frequency domain electromagnetic induction (EMI), total field magnetometry (TFM), and ground penetrating radar (GPR). These UXO sensors have been deployed on ground-based platforms such as portable devices, push carts, and towed sensor arrays. Standard analysis methods of these types of data are well described in the prior art. These methods typically rely on generating theoretical sensor response models, or measuring pure responses of various UXO items and then comparing survey data to these models in order to make a detection or classification. However, typically, the ability of such techniques to cover wide survey areas is limited.

Furthermore, as the sensitivity/ground penetration depth of direct UXO sensing technologies, such as magnetometry, drops steeply with distance, alternate techniques for wide-area assessment will generally not have the benefit of sensing deeply buried UXO objects directly. Instead, they must rely on sensing UXO-related phenomena like spectral chemical signatures, variations in heat capacity, and measurements of surface clutter and microtopological features. The techniques of synthetic aperture radar (SAR), light detection and ranging (LiDAR), and high-resolution aerial photography all yield information about microtopological features and surface clutter of wide areas under assessment. These sensors have the benefit of functioning over much greater distances than electromagnetic sensors, allowing them to be deployed on fixed wing aircraft.

Wide-area sensing platforms are typically designed and optimized to detect UXO or UXO-related features without correlation to other sources of data or expert information. Data are acquired and processed via feature extraction, manual inspection and feature identification. Final site assessment is provided by evaluating the extracted UXO-related features, taking into account a priori knowledge as to how accurate the features are at indicating the presence of UXO and/or UXO-related objects. Thus, two types of information are obtained from sensing: UXO-related features extracted from survey data, and meta-data regarding the relationship between UXO and these features. Further information can be obtained from manual assessment of the site. Areas associated with UXO-related activities can be delineated through visual inspection of sensing data or through knowledge of historical usage patterns at the site. Examples of this type of information include delineations of visible bombing targets and descriptions of known munitions ranges. Thus, in the conventional art, at each survey site, site managers can potentially have multiple, disparate lines of evidence for or against the presence of UXO or UXO-related items, without a way to combine these different forms of evidence to make a more delineation of areas of likely UXO contamination.

Accordingly, there remains a need for a method or system that can utilize all the available evidence for or against the presence of UXO or UXO-related items, and in turn, allow site managers to more accurately delineate areas of likely UXO contamination.

SUMMARY OF THE INVENTION

To date, effective wide-area assessment has been hindered by a lack of accurate target and range information. In addition, no single sensing technology has been both accurate and cost-effective in surveying entire sites. The invention satisfies the above-described and other needs by providing a system and method that can combine multiple data streams, taking advantage of the strengths of individual sensing platforms while minimizing the weaknesses, and accounting for unreliability in data streams.

According to one aspect of the invention, one or more wide-area survey data sources, wherein the wide-area survey data sources comprise a geographic registration and a degree of belief, can be analyzed. The wide-area survey data sources can be registered to a common map grid based on the geographic registration. A plurality of feature layers can be extracted from the wide-area survey data sources, and then a plurality of feature maps can be generated for each of the plurality of feature layers based on the degree of belief. The feature layers can then be combined in a data fusion module, which can generate a plurality of output maps.

For another aspect of the invention, one or more wide-area survey data sources can be analyzed in a data source module, wherein the wide-area survey data sources comprise a geographic registration and a degree of belief. The wide-area survey data sources can be registered to a common map grid based on the geographic registration in the data source module. A plurality of feature layers can be extracted from the wide-area survey data sources in a feature layer module. A plurality of feature maps can then be generated for each of the plurality of feature layers based on the degree of belief in a feature map module. The plurality of feature maps can then be combined in a data fusion module, which generates a plurality of output maps.

For another aspect of the invention, one or more wide-area survey data sources can be analyzed. Specifically, a data fusion framework can include a data source module, a feature layer module, a feature map module, and a data fusion module for assessing wide areas of geographic sites for unexploded ordnance. The data source module can be configured to analyze the one or more wide-area survey data sources and register the wide-area survey data sources to a common map grid. The feature layer module can be configured to extract a plurality of feature layers from the wide-area survey data sources. The feature map module can be configured to generate a plurality of feature maps for each of the plurality of feature layers. The data fusion module can be configured to combine the plurality of feature maps and generate a plurality of output maps.

These and other aspects, objects, and features of the present invention will become apparent from the following detailed description of the exemplary embodiments, read in conjunction with, and reference to, the accompanying drawings.

DETAILED DESCRIPTION OF EXEMPLARY EMBODIMENTS

Referring now to the drawings, in which like numerals represent like elements, aspects of the exemplary embodiments will be described in connection with the drawing set.

Figure 1:
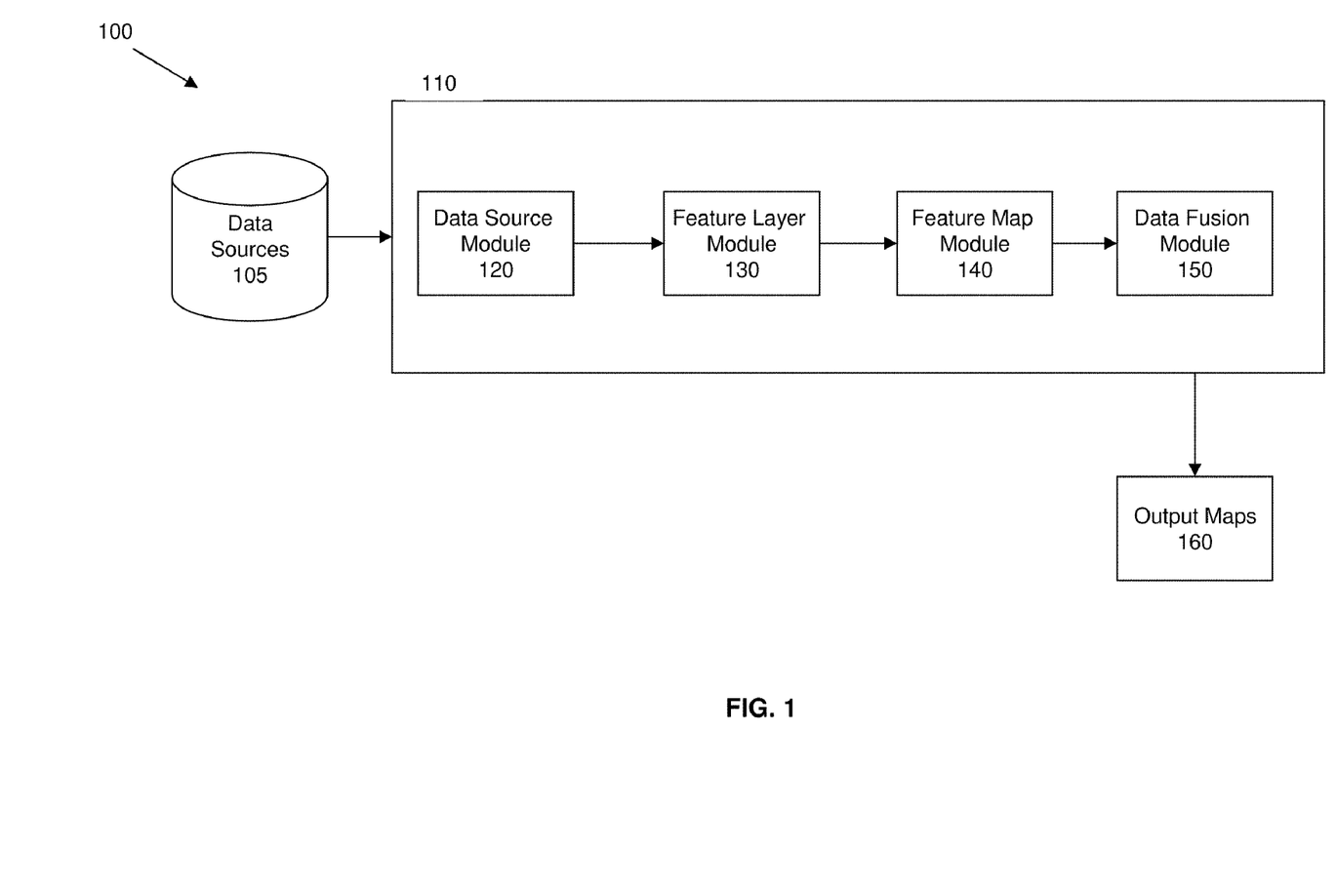
FIG. 1 is a block diagram of a system comprising one or more data sources and a data fusion framework.

FIG. 1 is a block diagram of a system 100 comprising one or more data sources 105 and a data fusion framework 110. The one or more data sources 105 can include data obtained from a number of different types of wide area assessment (WAA) technologies, such as techniques of synthetic aperture radar (SAR), light detection and ranging (LiDAR), high-resolution aerial photography, airborne infrared laser imaging combined with thermal imaging, orthophotography data, and airborne magnetometer arrays. Other data sources can include survey data derived from manually inspecting geographic sites of interest, and other historical, geographical, and/or topographical data. These types of sources could include archive search reports for sites of interest that consist of items such as historical records of site usage, data from previous surveys, first hand experience of local inhabitants, and other sources of expert knowledge.

In common, the one or more data sources 105 can each include relevant content information, a geographic registration, and a degree of belief connection to the relevant content information. This one or more data sources and the accompanying information (relevant content material, geographic registration, and the degree of belief connection to the relevant content information) can be stored in a common database or in separate databases. In one embodiment, the databases can be geo-referenced to easily locate data sources for particular geographic areas.

When conducting a wide area assessment to determine areas of contaminated sites, such as sites with unexploded ordnance (UXO), the relevant content information will include survey information about the land. As mentioned above, an example of this survey information can include LiDAR data, which can show cratering of the ground surface. This type of LiDAR data is relevant to determining UXO areas because, while UXO itself does not necessarily cause crater formation, craters indicate a land usage pattern of active ordnance bombardment, and through the assumption of collocation, a commensurate increase in the likelihood that UXO is present. The LiDAR data source included in the one or more data sources 105 represents a particular geographic area, or site, in which the relevant information has been obtained.

The geographic registration for each of the data sources 105 represents a geographic site for the relevant content information. For example, the LiDAR data discussed above could include many different geographic locations, or sites. A database containing the data sources 105 could be geo-referenced based on the geographic registration. Therefore, each data source applicable to a particular geographic site could be easily located.

The degree of belief for each of the data sources 105 represents a probability that the relevant content information in the data sources provides reliable information, such as whether something is or is not present, or whether not enough information is available to determine whether something is or is not present. For example, when determining areas of UXO, the degree of belief could represent whether or not UXO is present at a particular site based on the data source. In the case of LiDAR data representing crater formation on the ground, the presence of craters may indicate that there is an 80% chance UXO is present and a 20% chance that UXO is not present. However, if an unknown local inhabitant says that UXO is present in a particular area, the degree of belief that UXO is present at that particular site would most likely be lower, such as 25% chance that UXO is present, a 25% chance that UXO is not present, and a remaining 50% that not enough information is available to make the determination whether UXO is present or not.

The data source module 120 as part of the data fusion framework 110 can analyze the one or more wide-area survey data sources 105. This analysis can include registering the wide-area survey data sources to a common map grid based on the geographic registration. The data source module 105 can utilize the geographic registration information of a data source and lay out the content information from each source on the grid. The resolution of the grid can depend on the type of data sources that are available and how accurate they are. In one embodiment, grid areas of one meter by one meter were utilized. However, as noted, some data sources do not provide this level of accuracy; and therefore, not all areas of the grid will necessarily contain all the data sources 105. Locations (i.e., pixels) on the common grid can serve as indices to access survey data and site information pertinent to that grid location.

A feature of the data fusion framework 110 is that it can be capable of utilizing all the data sources 105 available, without necessarily requiring that the exact same data source(s) 105 for each assessment. For example, two assessments may be needed for two separate geographic regions, e.g., Site A and Site B. There may be four data sources available for Site A, but only two Data Sources for Site B. The data fusion framework 110 can operate similarly for both assessments even though the total number of data sources available is different. This flexibility is an important feature of the data fusion framework as it is expected that, for a number of reasons, it will rarely be the case that exactly the same types or quality of data sources will be available for analysis each time a wide-area UXO assessment is performed.

The degrees of belief of data sources can be represented on the grid by illustrating probability densities for all locations on the grid. As noted above, when determining areas of UXO, the degree of belief connection to the relevant content information can represent whether or not UXO is present at a particular site based on the data source. At a given data point in the survey grid, three quantities can be important: (1) p{UXO}, the probability that UXO is present; (2) p{~UXO}, the probability that UXO is not present; and (3) p{UXO, ~UXO}, the probability that the presence or absence of UXO is ambiguous, based on the observed data.

For example, with the LiDAR data, areas of high concentrations of craters may be represented by illustrating those areas of the grid with a particular color, such as red, where high concentrations of craters are represented by different intensities of shades of red. However, areas of low concentrations of craters could be represented by a different color, such as blue, and those areas where craters are minimal or non-existent could be represented by different intensities of shades of blue. Unknown or uncertain areas regarding crater information could be represented by a third color. All these intensities and colors can be represented in all locations of the grid for each data source and the relevant content information associated with that data source.

The feature layer module 130 can extract a plurality of feature layers from the wide-area survey data sources. More specifically, the feature layer module 130 can provide algorithmic means of enabling or enhancing the extraction of UXO-relevant features from non-informative data contained within the one or more data sources 105. Thus, the additional data in the extracted feature layers can be included to the multiple data sources 105 to enhance the assessment of sites that may contain UXO. Additionally, the feature layers can be registered to the same common map grid that the data sources were registered, based on the geographic registration.

In one embodiment, the feature layer module 130 can extract a feature layer from manual survey data. Manual survey data of a geographical site can include location information for structures, housing, roads, fence lines, etc. When conducting a wide-area assessment, these types of structures may be represented on different survey data sources indicating the possible presence of UXO; however, UXO is most likely not present there (e.g., UXO is most likely not present where a house is represented on a map). These types of geographic sites can be grouped together in the feature layer module 130 to produce a feature layer that describes features that could potentially lead to significant non-UXO related magnetometry signal (e.g., "structure", "fence line", "road").

In another embodiment, the manual survey data can represent areas where UXO are highly likely to be present. This type of manual survey data could include aerial bombing target maps that the military may have kept track of. Therefore, these types of geographic sites can be grouped together in the feature layer module 130 to produce a feature layer that describes features that could potentially lead to significant UXO sites.

In another embodiment, the feature layer module 130 can extract a feature layer from LiDAR data by an automatic cratering algorithm. The principal feature in LiDAR data associated with UXO is cratering of the ground surface. While UXO itself typically do not cause crater formation, craters indicate a land usage pattern of active ordnance bombardment. A challenge to automatic crater identification is that the observed depth of UXO-related craters can be small relative to the overall changes in elevation experienced within the survey area. Therefore, the detection of craters must occur through the location of crater-specific arrangements of pixel values within the LiDAR image rather than directly through pixel values themselves.

In an exemplary embodiment, the automatic cratering algorithm can utilize the circular Hough transform, which is a popular algorithm used in machine vision for locating objects of radial symmetry. However, implementation of standard circular Hough transform on LiDAR survey data can be relatively nonselective for craters; therefore, hampering the utility of the circular algorithm output as an input into a data fusion framework. Therefore, to improve the selectivity, an algorithm can be implemented within a computing environment, such as MATLAB or other type of computing environment. This algorithm can first estimate the gradient magnitude and direction for each pixel in a LiDAR surface image, removing gradient magnitudes less than a given threshold. Next, a windowed filter can be applied across the gradient direction image to calculate a difference between the region local to the center of the filter and an "ideal crater" template. Surface gradients that were within a set tolerance of their counterpart in the crater template can be located, with each one counting as one vote. The filter can generate the number of votes each potential crater location garnered, and normalize that value by the total number of potential votes. Eventually, pixels with a value of less than a set threshold can be discarded, and the remaining pixels can be flagged as crater center locations.

In another embodiment, the feature layer module 130 can extract a feature layer from helicopter magnetometry data by utilizing a nearest neighbor clustering algorithm. Helicopter magnetometry data represents concentrations of metallic materials in the ground, which can be representative of UXO. However, deviations in the background magnetic field of the earth due to the presence of ferromagnetic materials on or below the surface of the ground will also be represented by helicopter magnetometry data. Ferrous materials that may be present at a survey site include not only UXO and ordnance-related scrap but also a background of non-UXO related signal comprised of man-made features such as buildings, fences, pipelines, general metallic detritus, and magnetically active geological features. Thus, the main criterion for a successful detection algorithm for wide-area assessment of ordnance-related material is the accurate separation and extraction of UXO-related signal from background with computationally reasonable methods.

The algorithm performed by the feature layer module 130 is built on the assumption that magnetic anomalies of non-UXO phenomena are likely to be more uniformly distributed throughout the surveyed areas than UXO-related anomalies, which were more likely to be clustered around bombing targets. For each magnetic anomaly, the Euclidian distance between itself and all other magnetic anomalies can be calculated and ordered by the feature layer module 130. A set of radii are selected to establish concentric neighborhoods around the anomaly under analysis. For each magnetic anomaly, the number of adjacent anomalies located within each neighborhood of radius r is counted and stored as a histogram. An anomaly can be considered UXO-related (i.e., a member of a cluster) if it has at least 10 adjacent anomalies within a radius of r=64 meters, as determined from the histograms. The threshold for required adjacent anomalies may be varied to account for different survey and site characteristics In another embodiment, the feature layer module 130 can extract a feature layer from helicopter magnetometry data by utilizing a pixel clustering technique. The pixel clustering technique can be focused on extracting features relevant for ordnance-related signal in the context of density, intensity, and morphology aspects to the data. In one feature of the embodiment, the magnetometry data can have a threshold set to ten units to remove spurious and small-valued background. An algorithm can be developed to identify clusters of adjacent, above-threshold pixels and group them into "pixel islands." Adjacent pixels can be defined as a pixel's eight nearest neighbors. An island can be defined as any cluster of two or more adjacent and above-threshold pixels. In order to generate the feature layer, the pixel clusters determined to be UXO-related magnetic anomalies can be used to estimate a site-wide anomaly density map. However, while pixel islands are able to capture ordnance-related features in the magnetometry data, significant ferromagnetic background from man-made structures (e.g., a clearly visible horizontal fence line in the survey region) can be equally well captured. Therefore, in order to distinguish ordnance-related features from structured ferromagnetic background, an algorithm in the feature layer module 130 can be programmed to filter pixel islands based on the number of pixels each island contains. The feature layer module 130 can then set threshold amounts for sizes of pixel islands and what they may recommend. Typically, pixel islands with larger numbers of pixels represent man-made structures.

It is understood to one of ordinary skill in the art, that other feature layers, not discussed herein, can be extracted from the one or more data sources 105 in order to enhance the wide-area assessment of geographic sites to locate UXO.

Extracted features layers constitute multiple, disparate lines of evidence for or against the presence of UXO or UXO-related items at each survey site. While each feature layer can be visually displayed, and even overlaid on a common site grid, the disparity between the different feature layers makes it difficult to algorithmically combine the evidence provided by them into an overall assessment of a geographic site. In order to overcome this difficulty, each available extracted feature layer can be converted into a feature map to assist a data fusion framework. In an exemplary embodiment, the feature map module 140 can generate a plurality of feature maps for each of the plurality of feature layers based on the degree of belief indicating the strength of that feature across the survey site. In this exemplary embodiment, the feature map module 140 can produce three feature maps for each feature layer.

The generation of the feature maps by the feature map module 140 allows for a pixel-by-pixel determination of feature specific evidence related to UXO contamination throughout the survey site. To fuse the information provided by the input feature layers, a hybrid data fusion algorithm based on the Dempster-Shafer theory for probabilistic combination can be utilized. This data fusion algorithm uses a frame of discernment of {UXO, ¬UXO}, providing three separate Dempster-Shafer focal elements to which probability assignments can be made by feature-based evidence: {UXO}, reflecting the belief that UXO was present, {¬UXO}, reflecting belief that UXO was not present, and {UXO, ¬UXO}, reflecting ignorance (i.e., uncertainty) regarding the presence of UXO. For each feature layer, a specification of a probability mass assignment function that relates to the probability mass assignments for each focal element to feature intensity over the range of feature intensities observed can be defined. More specifically, the feature map module 140 apportions a unit probability mass across the frame of discernment elements (UXO, ~UXO, and uncertainty) for each possible value of feature map intensity.

The data fusion module 150 can combine the plurality of feature maps and generate a plurality of output maps 160. A Dempster-Shafer theory for probabilistic combination fusion can begin with the combination of two feature layers, each represented by three feature maps, which results in three site-wide output maps 160 reflecting assignments to each focal element supported by the combination of the feature maps of the two feature layers. This output maps 160 can then updated sequentially with the feature maps of each subsequent feature layer until all feature layers have been incorporated. The data fusion algorithm is customized in order ensure that this process is transitive in nature (i.e. the output maps are invariant to the order in which feature layers are presented) and to interpret regions with undefined feature intensity values as non-informative.

For example, the feature maps of Feature Layer A and Feature Layer B can be combined in the data fusion module 150 to produce output maps for Feature Layers AB. Subsequently, the feature maps of Feature Layer C can be combined with the output maps of Feature Layers A & B in the data fusion module 150 to produce output maps for Feature Layers ABC. Additional feature maps for the remaining feature layers can subsequently be incorporated. The output maps 160 generated by the data fusion module 150 provide assessments of the degree of belief connection to the relevant content information assigned to each of the three focal elements in the UXO wide-area assessment task based on the pooled evidence provided by each feature layer. This information can be used, in turn, by UXO site managers to support decisions regarding remediation efforts.

Additionally, the step combining the plurality of feature maps in the data fusion module 150 can further comprise the step of incorporating heuristic rules into the data fusion module 150 to quantify known interdependencies between feature layers. The incorporation of heuristic rules can allow incorporation of an important additional layer of meta-knowledge regarding the survey data.

For example, it is possible that manually delineated regions of interest in a feature layer may describe locations or objects associated with significant non-UXO magnetic signals, such as fence lines, man-made structures, and pipelines. Accordingly, the impact of magnetic signals recorded at these locations on the output maps should be minimized or blocked. A second example reflects the incorporation of measures of data quality. Helicopter magnetometry data layer is typically estimated from point measurements that were acquired at non-regular spatial intervals and provided non-homogenous coverage of the survey site. Areas with sparse data point coverage in the magnetometry data can provide less certain information than those with dense coverage. Knowledge of the quality of data point coverage can be needed to accurately reflect the data in the output maps. Thus, in a general sense it is important to incorporate heuristic rules by which these kinds of knowledge can be incorporated into the data fusion module 150.

For the first example of minimizing the impact of non-UXO magnetic signals, a heuristic rule incorporating the concept of blocking known non-UXO magnetic signals can be implemented as follows. First, feature layers associated with significant non-UXO magnetic signal can be flagged as one type of category. Second, feature layers susceptible to this form of magnetic interference can be flagged as a second type of category. Finally, a general heuristic rule can be added to the data fusion algorithm in the data fusion module 150 that can indicate that whenever a feature layer belonging to the second type of category is being used, then and update to the current UXO assessment can be performed. Specifically, this heuristic rule can set the regions on the feature maps of that feature layer coinciding with the non-UXO magnetic signal to a value of zero, indicating that UXO is not present. Additional heuristic rules can be applied for additional feature layers.

One of ordinary skill in the art will understand that other data fusion algorithms can be utilized. For example, the data fusion module 150 can utilize a Bayesian inference theory or a heuristic-based linear combination method for performing data fusion. The data fusion algorithms can be implemented within a computing environment, such as MATLAB or other type of computing environment.

Figure 2:
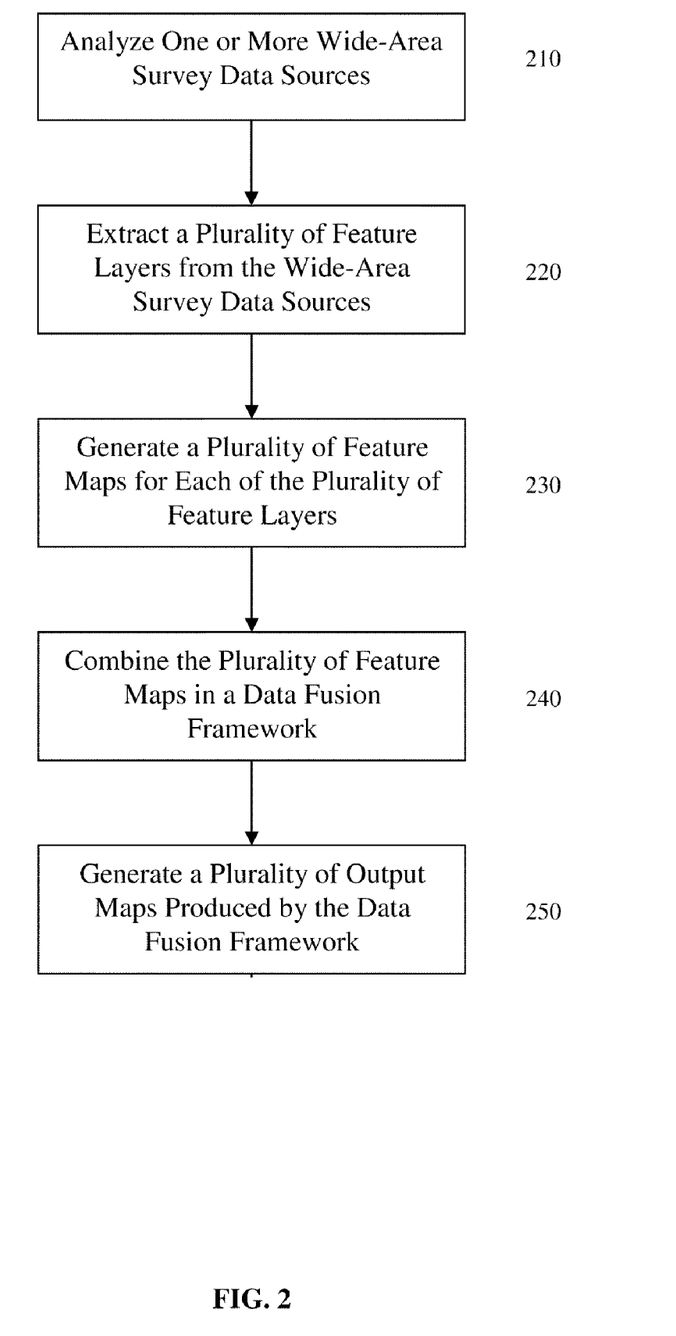
FIG. 2 is a flow chart illustrating an exemplary method for assessing a wide-area of geographic sites for sensing and surveillance tasks, and for other sensing and surveillance tasks in accordance with an exemplary embodiment of the invention.

FIG. 2 is a flow chart illustrating an exemplary method for assessing a wide-area of geographic sites for sensing and surveillance tasks, and for other sensing and surveillance tasks in accordance with an exemplary embodiment of the invention. In Step 210, one or more wide-area survey data sources are analyzed. The wide-area survey data sources can comprise a geographic registration and a degree of belief connection to the relevant content information. Step 210 can include registering the wide-area survey data sources to a common map grid based on the geographic registration. Step 210 can be performed by a data source module 120, wherein the data source module 120 is implemented in a computer system that comprises instructions stored in a machine-readable medium and a processor that executes the instructions.

In Step 220, a plurality of feature layers can be extracted from the wide-area survey data sources. Step 220 can further include of registering the plurality of feature layers to a common map grid based on a geographic registration. The common map grid can be the same common map grid that the one or more data sources have been registered. Step 220 can be performed by a feature layer module 130, wherein the feature layer module 130 is implemented in a computer system that comprises instructions stored in a machine-readable medium and a processor that executes the instructions.

In Step 230, a plurality of feature maps can be generated for each of the plurality of feature layers. Step 230 can be based on a degree of belief connection to the relevant content information. Step 230 can further include apportioning a unit probability mass across the frame of discernment elements (UXO, ~UXO, and uncertainty) for each possible value of feature map intensity. Step 230 can be performed by a feature map module 140, wherein the feature map module 140 is implemented in a computer system that comprises instructions stored in a machine-readable medium and a processor that executes the instructions In Step 240, the plurality of feature maps can be combined in a data fusion module 150. Step 240 can further include incorporating heuristic rules into the data fusion module to quantify known interdependencies between feature layers and can utilize a Dempster-Shafer theory for probabilistic combination. In Step 250, a plurality of output maps produced by the data fusion module 150 can be generated. The data fusion module 150 of Steps 240 and 250 can be implemented in a computer system that comprises instructions stored in a machine-readable medium and a processor that executes the instructions.

Figure 3:
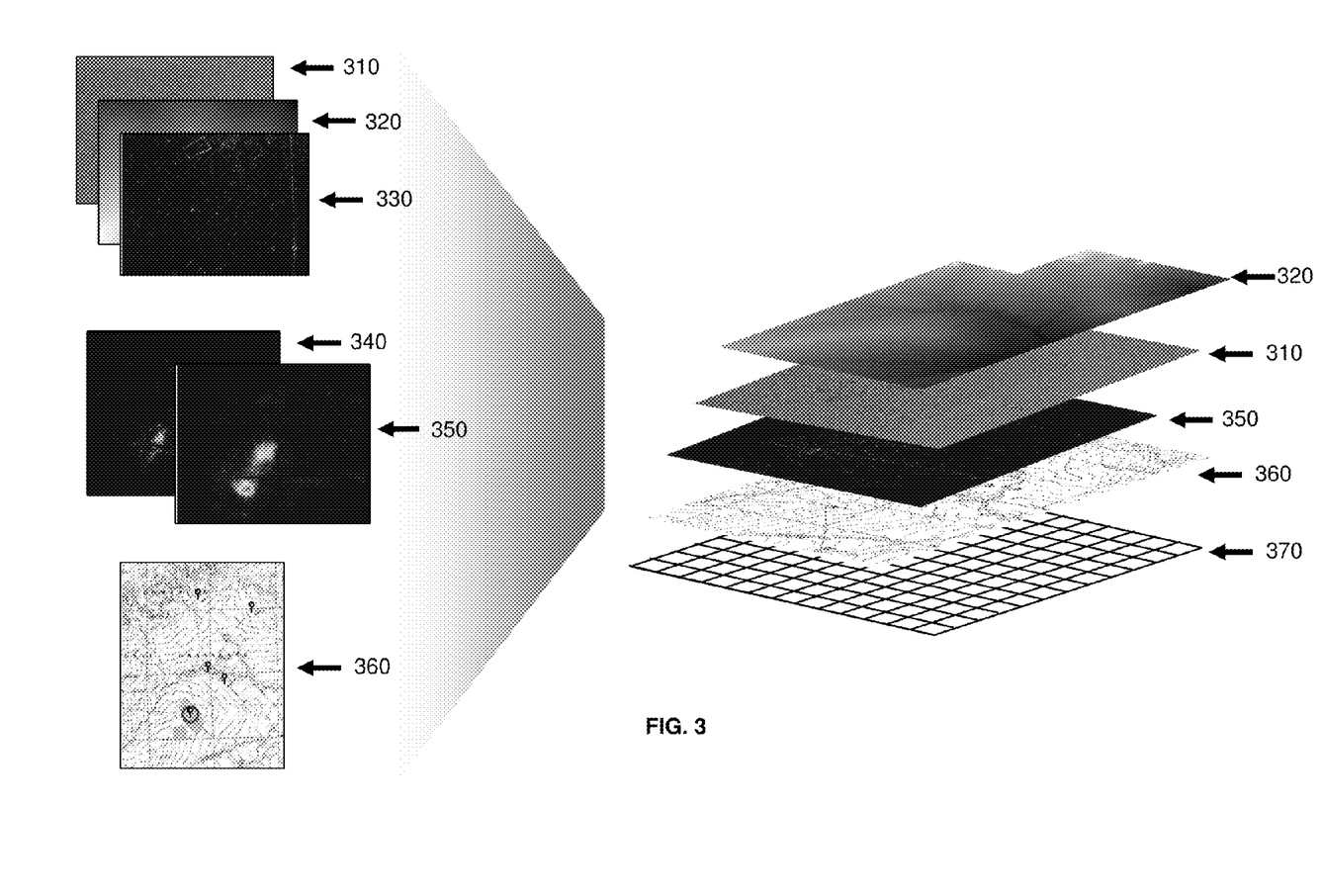
FIG. 3 is a block diagram illustrating one or more data sources with an exemplary embodiment of the invention.

FIG. 3 is a block diagram illustrating one or more data sources with an exemplary embodiment of the invention. The one or more data sources 105 can include data obtained from a number of different types of wide-area assessment (WAA) technologies. In the example block diagram in FIG. 3, the data sources include disparate sensors data sources, such as high-resolution aerial photography 310, light detection and ranging (LiDAR) survey data 320, and airborne (e.g., helicopter) magnetometry 330. Additional data sources can include extracted features derived from sensor data sources. For example, a crater density map 340 can be extracted from the LiDAR survey data, and the magnetic anomaly density 350 can be extracted from the helicopter magnetometry data. Details regarding feature extraction methods from data sources are discussed in relation to the feature layer module 130 in FIG. 1. Finally, other data sources can include survey data derived from manually inspecting geographic sites of interest 360.

As discussed with respect to the data fusion module 120 of FIG. 1, the one or more data sources can include a geographic registration. For example, the LiDAR survey data 320 can represent a particular geographic area, or site, in which the relevant information has been obtained. Additionally, the crater density map data 340 that is extracted from the LiDAR survey data 320 represents the same particular geographic area, or site, or portion thereof. The data fusion module 120 can utilize the geographic registrations for each of the data sources to register the data sources to a common map grid. As an example, as represented in FIG. 3, the LiDAR survey data 320, high-resolution aerial photography 310, magnetic anomaly density 350, and manual inspection data 360 are registered to a common data grid 370. However, all the data sources 310, 320, 330, 340, 350, 360 could be registered to the common data grid 370, assuming their respective geographic registrations overlapped.

The resolution of the common data grid 370 can depend on the type of data sources that are available and how accurate they are. In one embodiment, grid areas of one meter by one meter can be utilized for the common data grid 370. However, as noted, some data sources do not provide this level of accuracy; and therefore, not all areas of the grid will necessarily contain all the data sources. Locations (i.e., pixels) on the common grid can serve as indices to access survey data and site information pertinent to that grid location.

Figure 4:
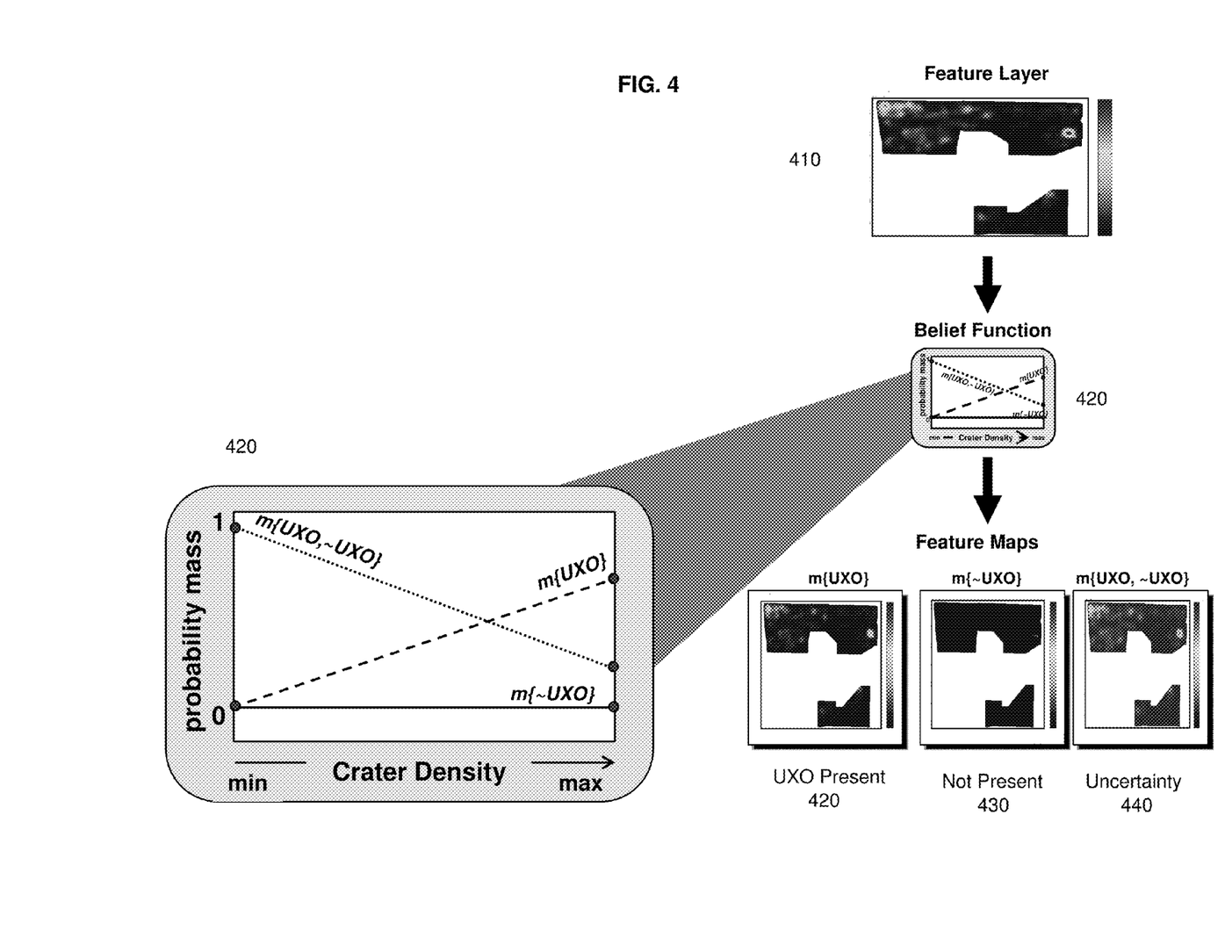
FIG. 4 is a block diagram illustrating a method of generating a plurality of feature maps for each of the plurality of feature layers with an exemplary embodiment of the invention.

FIG. 4 is a block diagram illustrating a method of generating a plurality of feature maps for each of the plurality of feature layers. The feature layer 410 can be any one of the data sources or feature layers; however, in this particular Figure, the feature layer 410 is a crater density feature layer as extracted from LiDAR data survey as discussed in FIG. 3. In an exemplary embodiment, the feature map module 140 can generate a plurality of feature maps for each of the plurality of feature layers based on the degree of belief connection to the relevant content information indicating the strength of that feature across the survey site. In this exemplary embodiment represented in FIG. 4, the feature map module 140 produces three feature maps 430, 440, 450 for feature layer 410.

To fuse the information provided by the feature layer 410, a hybrid data fusion algorithm based on the Dempster-Shafer theory for probabilistic combination can be utilized. This data fusion algorithm uses a frame of discernment of {UXO, ¬UXO}, providing three separate Dempster-Shafer focal elements to which probability assignments can be made by feature-based evidence: {UXO}, reflecting the belief that UXO was present, {¬UXO}, reflecting belief that UXO was not present, and {UXO, ¬UXO}, reflecting ignorance (i.e., uncertainty) regarding the presence of UXO. For each feature layer, a specification of a probability mass assignment function that relates to the probability mass assignments for each focal element to feature intensity over the range of feature intensities observed can be defined. More specifically, the feature map module 140 apportions a unit probability mass across the frame of discernment elements (UXO, ~UXO, and uncertainty) for each possible value of feature map intensity.

The belief function 420 based on the degree of belief connection to the relevant content information provides the representation of the probability mass of the feature layer 410 over different feature layer intensities. For example, at a feature intensity of zero crater density, all probability mass is assigned to uncertainty. This reflects the fact that an absence of craters at a particular geographic site provides neither positive nor negative evidence for the presence of UXO-related objects at the site. In another embodiment, at the maximum crater density observed (i.e., an intensity value of 1), a probability mass of 0.75 is assigned to the proposition that UXO was present and 0.25 to uncertainty, reflecting the assertion that relatively high crater densities are associated with the presence of UXO-related objects, although not unequivocally so. Based on the belief function 420, each of the three feature maps 430, 440, 450 can be generated for each point on the grid.

Figure 5:
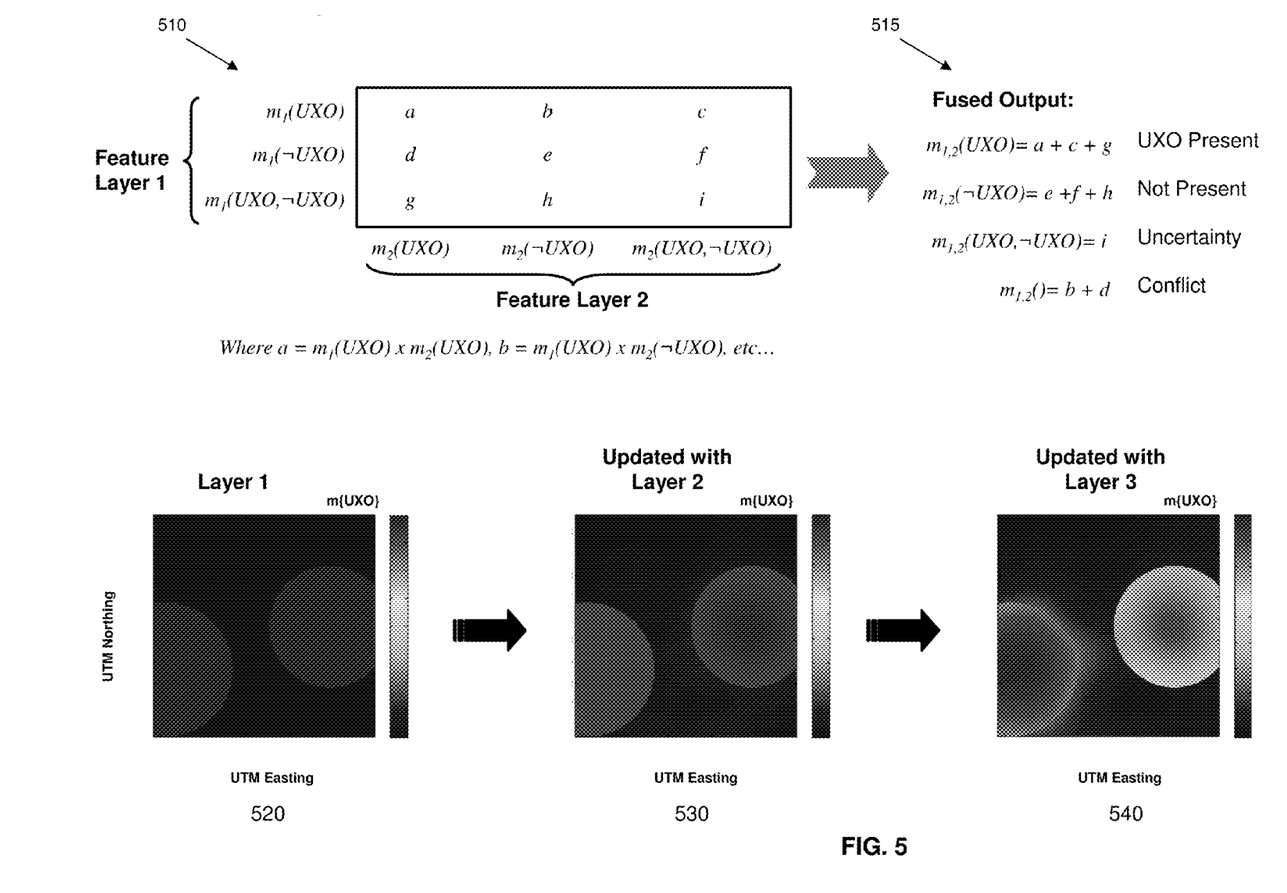
FIG. 5 is a block diagram illustrating a method of combining the plurality of feature maps in a data fusion module with an exemplary embodiment of the invention.

FIG. 5 is a block diagram illustrating a method of combining the plurality of feature maps in a data fusion module. The feature maps 430, 440, 450 produced by the feature map module 140 (and represented in FIG. 4) can be combined on a point-by-point basis throughout the survey grid according to the Dempster-Shafer combination algorithm 510 in the date fusion module 150. The combination algorithm combines the feature maps of two sets of feature layers at a time. In combination algorithm 510, feature layer 1 and feature layer 2 are combined.

At each point in the feature maps, the cross products of the probability mass assignments from the three focal elements of the UXO frame of discernment form a set of nine terms. Three of these support the focal element {UXO} (that UXO is present and represented by letters a, c, and g in FIG. 5), three support {¬UXO} (that UXO is not present and represented by letters e, f, and h in FIG. 5), one supports {UXO, ¬UXO} (uncertainty and represented by letter i in FIG. 5), and two represent evidence assigned to null set, { }, which indicates the amount of conflict between the different lines of evidence (and represented by letters b and d in FIG. 5). The output probability masses for {UXO}, {¬UXO}, and { } can be calculated by summing the appropriate terms as shown at 515.

Evidence can be combined in a serial fashion, with the probability mass assignments of additional feature layers combined with the output assignments generated by Dempster-Shafer combination of previous feature layers. In order to preserve the transitive nature of this operation (i.e., to ensure that evidence combined in any order provided the same output) assignments made to the null set, or conflict, can be propagated separately until the final feature layer is combined and is reapportioned equally among the other elements in the final output map.

As an example, and represented in FIG. 5, after the combination of feature layer 1 and feature layer 2 with the combination algorithm 510, an output map representing focal element {UXO} 530 of the combined layers (feature layer 1 and feature layer 2) can be generated. As a frame of reference, combination output map 530 can be compared to output map 520, which represents the focal element {UXO} of feature layer 1 by itself. Subsequent feature layers can be combined serially. For example, output map 540 represents a generated output map representing the focal element {UXO} for the combination of feature layer 1, feature layer 2, and feature layer 3. This combination can occur after taking output map 530 and combining it with the focal element {UXO} for feature layer 3 (not represented in FIG. 5) utilizing the combination algorithm 510.

Figure 6:
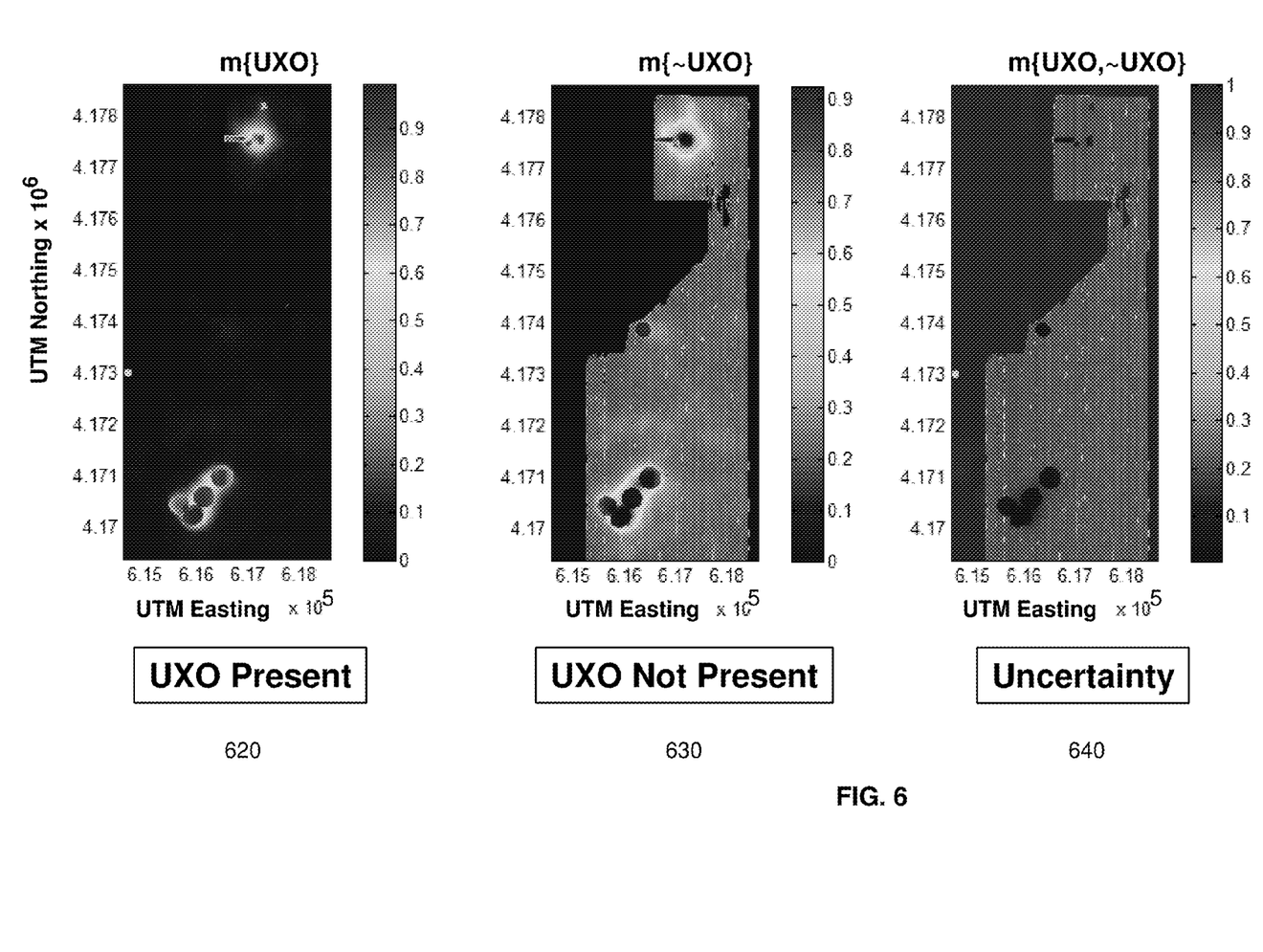
FIG. 6 is a block diagram illustrating a plurality of output maps produced by the data fusion module with an exemplary embodiment of the invention.

FIG. 6 is a block diagram illustrating a plurality of output maps produced by the data fusion module with an exemplary embodiment of the invention. The resulting output maps 620, 630, 640 generated by the data fusion module 150 provide assessments of the degree of belief connection to the relevant content information assigned to each of the three focal elements (UXO, ~UXO, and uncertainty) for this particular geographic region. While not represented in FIG. 6, these output maps can be generated based on a combination of one or more feature layers of data. This information can be used, in turn, by UXO site managers to support decisions regarding remediation efforts. Most likely UXO site manager will look to high intensity areas where UXO are most likely present.

Heuristic rule modules can be implemented by the data fusion module 150 prior to the generation of the output maps to allow incorporation of an important additional layer of meta-knowledge regarding the survey data. In one embodiment, heuristic rules have been added to account for increased uncertainty in feature layers where magnetometry data density is low. In another embodiment, heuristic rules have been added to contraindicate UXO when magnetic features are collocated with manually identified man-made structures.

The invention comprises a computer program that embodies the functions described herein and illustrated in the appended flow charts. However, it should be apparent that there could be many different ways of implementing the invention in computer programming, and the invention should not be construed as limited to any one set of computer program instructions. Further, a skilled programmer would be able to write such a computer program to implement an exemplary embodiment based on the flow charts and associated description in the application text. Therefore, disclosure of a particular set of program code instructions is not considered necessary for an adequate understanding of how to make and use the invention. The inventive functionality of the claimed computer program will be explained in more detail in the following description read in conjunction with the figures illustrating the program flow.

It should be understood that the foregoing relates only to illustrative embodiments of the present invention, and that numerous changes may be made therein without departing from the scope and spirit of the invention as defined by the following claims.

The invention claimed is:

1. A method for assessing a wide area of geographic sites for sensing and surveillance tasks, comprising the steps of:
    analyzing one or more wide-area survey data sources;
    extracting a plurality of feature layers from the wide-area survey data sources;
    generating a plurality of feature maps for each of the plurality of feature layers;
    combining the plurality of feature maps in a data fusion module; and
    generating a plurality of output maps produced by the data fusion module.

2. The method of claim 1, wherein the wide-area survey data sources comprise a geographic registration and a degree of belief.

3. The method of claim 1, wherein the step of analyzing the one or more wide-area survey data sources comprises registering the wide-area survey data sources to a common map grid based on a geographic registration.

4. The method of claim 1, wherein the step of analyzing the one or more wide-area survey data sources is performed by a data source module, wherein the data source module is implemented in a computer system that comprises instructions stored in a machine-readable medium and a processor that executes the instructions.

5. The method of claim 1, wherein the step of extracting a plurality of feature layers from the wide-area survey data sources is performed by a feature layer module, wherein the feature layer module is implemented in a computer system that comprises instructions stored in a machine-readable medium and a processor that executes the instructions.

6. The method of claim 1, further comprising the step of registering the plurality of feature layers to a common map grid based on a geographic registration.

7. The method of claim 1, wherein the step of generating the plurality of feature maps for each of the plurality of feature layers is based on a degree of belief.

8. The method of claim 1, wherein the step of generating the plurality of feature maps for each of the plurality of feature layers is performed by a feature map module, wherein the feature map module is implemented in a computer system that comprises instructions stored in a machine-readable medium and a processor that executes the instructions.

9. The method of claim 1, wherein the step of generating the plurality of feature maps for each of the plurality of feature layers further comprises apportioning a unit probability mass across one or more frame of discernment elements for each possible value of feature map intensity.

10. The method of claim 1, wherein the data fusion module is implemented in a computer system that comprises instructions stored in a machine-readable medium and a processor that executes the instructions.

11. The method of claim 1, wherein the step of combining the plurality of feature maps in a data fusion module utilizes a Dempster-Shafer theory for probabilistic combination.

12. The method of claim 1, wherein the step of combining the plurality of feature maps in a data fusion module further comprises the step of incorporating heuristic rules into the data fusion module to quantify known interdependencies between feature layers.

13. A method for assessing a wide-area of geographic sites for unexploded ordnance, comprising the steps of:
analyzing one or more wide-area survey data sources in a data source module, wherein the wide-area survey data sources comprise a geographic registration and a degree of belief;
registering the wide-area survey data sources to a common map grid based on the geographic registration in the data source module;
extracting a plurality of feature layers from the wide-area survey data sources in a feature layer module;
generating a plurality of feature maps for each of the plurality of feature layers based on the degree of belief in a feature map module;
combining the plurality of feature maps in a data fusion module; and
generating a plurality of output maps produced by the data fusion module.

14. The method of claim 13, wherein the step of combining the plurality of feature maps in the data fusion module further comprises the step of incorporating heuristic rules into the data fusion module to quantify known interdependencies between feature layers.

15. The method of claim 13, wherein the data source module, feature layer module, feature map module, and data fusion module are implemented in a computer system that comprises instructions stored in a machine-readable medium and a processor that executes the instructions.

16. A system for assessing a wide area of geographic sites for unexploded ordnance, comprising:
one or more wide-area survey data sources; and
a data fusion framework, comprising:
a data source module configured to analyze the one or more wide-area survey data sources and register the wide-area survey data sources to a common map grid;
a feature layer module configured to extract a plurality of feature layers from the wide-area survey data sources;
a feature map module configured to generate a plurality of feature maps for each of the plurality of feature layers based on a degree of belief; and
a data fusion module configured to combine the plurality of feature maps and generate a plurality of output maps.

17. The system of claim 16, wherein the wide-area survey data sources comprise a geographic registration and a degree of belief.

18. The system of claim 17, wherein the data source module is configured to register the wide-are survey data sources to the common grid based on the geographic registration.

19. The system of claim 16, wherein the data fusion module is further configured to incorporate heuristic rules into the data fusion module to quantify known interdependencies between feature layers.

20. The system of claim 16, wherein the data source module, feature layer module, feature map module, and data fusion module are implemented in a computer system that comprises instructions stored in a machine-readable medium and a processor that executes the instructions.

* * * * *